United States Patent [19]

Sattelmeyer

[11] Patent Number: 5,145,905
[45] Date of Patent: Sep. 8, 1992

[54] VULCANIZATES COMPRISED OF DIFFERENT DIENE RUBBER COMPONENTS, AND NOVOLAK

[75] Inventor: Richard Sattelmeyer, Wiesbaden, Fed. Rep. of Germany

[73] Assignee: Hoechst AG, Fed. Rep. of Germany

[21] Appl. No.: 597,898

[22] Filed: Oct. 15, 1990

Related U.S. Application Data

[60] Continuation of Ser. No. 265,251, Oct. 31, 1988, abandoned, which is a division of Ser. No. 127,483, Dec. 1, 1987, Pat. No. 4,837,266.

[30] Foreign Application Priority Data

Dec. 3, 1986 [DE] Fed. Rep. of Germany ....... 3641344

[51] Int. Cl.$^5$ ............................ C08K 3/04; C08K 3/36
[52] U.S. Cl. .................................... 524/511; 152/151; 525/139
[58] Field of Search .................. 524/494, 511, 495; 525/139, 140, 141

[56] References Cited

U.S. PATENT DOCUMENTS 4,421,891 12/1983 Miyake ............................. 524/495
4,465,807 8/1984 Gillev ............................. 525/135
4,602,063 7/1986 Yamamoto ........................ 525/127

FOREIGN PATENT DOCUMENTS 681076 8/1979 U.S.S.R. .

Primary Examiner—Christopher Henderson
Attorney, Agent, or Firm—Bierman and Muserlian

[57] ABSTRACT

Rubber vulcanizates having a reduced heat evolution when subjected to dynamic deformation, prepared from vulcanizable rubber mixtures containing at least one type of rubber, a reinforcing resin system based on curable phenolic resins and other customary constituents, the vulcanizable rubber mixtures having been prepared from at least two rubber mixtures of different compositions. A process for their preparation by preparing in each case at least two different rubber mixtures differing from one another in their content of rubber, filler, oil, reinforcing resin system and, if appropriate, thermoplastic copolymer, by mixing the constituents thereof, then mixing the resulting mixtures with one another and vulcanizing the resulting final mixture. The use of the vulcanizable rubber final mixtures is for the production of mechanical rubber goods and tires.

9 Claims, No Drawings

VULCANIZATES COMPRISED OF DIFFERENT DIENE RUBBER COMPONENTS, AND NOVOLAK

PRIOR APPLICATION

This application is a continuation of U.S. patent application Ser. No. 265,251 filed Oct. 31, 1988, now abandoned which is a division of U.S. patent application Ser. No. 127,483 filed Dec. 1, 1987, now U.S. Pat. No. 4,837,266.

The invention relates to rubber vulcanizates composed of vulcanizable rubber mixtures containing at least one type of rubber, a reinforcing resin system based on curable phenolic resins and other customary constituents, the vulcanizable rubber mixtures having been prepared from at least two rubber mixtures of different compositions, to a process for their preparation and to their use, in particular as components of vehicle tires and as mechanical rubber goods.

The use of curable phenolic resins in the preparation of rubber vulcanizates has been known for a fairly long time. These products, which are usually also described as reinforcing resins, are phenolic resins of the novolak type and are cured, i.e. crosslinked, by means of suitable curing agents during the vulcanization of the rubber. Examples of the curing agents employed are formaldehyde donors, such as hexamethylenetetramine and partly or completely etherified melamine and urea resins containing methylol groups. The use of such resin systems in the rubber mixtures has the effect of improving certain important mechanical properties of the vulcanizates, such as, for example, the stress moduli, and also increasing the hardness. On the other hand, when subjected to repeated mechanical deformation, vulcanizates of this type exhibit a high evolution of heat, which can result, in time, in an impairment of the overall properties or even in destruction of the material.

It has now been found surprisingly, that the heat evolution of rubber vulcanizates of the same formulation when under dynamic loading is considerably lower if the rubber mixture employed has been prepared, not from a single mixture, but from at least two rubber mixtures of different compositions, of which, in the event that, for example, two different mixtures are employed, the first mixture A contains 50 to 95 parts by weight of rubber and 30 to 150 parts by weight of filler and the other mixture B contains 50 to 5 parts by weight of rubber and 80 to 5 parts by weight of filler, relative to 100 parts by weight of the total amount of rubber employed in the final mixture, and at least one of these mixtures A or B contains 2 to 30 parts by weight of a reinforcing resin system.

The behavior of the vulcanizates according to the invention is particularly surprising, because the mechanical properties, such as, for example, the hardness, the ultimate tensile strength, the elongation at break and the stress moduli do not differ essentially from those of vulcanizates which, with the same formulation, have been prepared from only one single mixture instead of different mixtures of different compositions.

The invention therefore relates to rubber vulcanizates based on at least one type of rubber and other customary constituents, the final vulcanizable rubber mixture being prepared by mixing at least two rubber base mixtures of different compositions in which the first base mixture A contains 50 to 95 parts by weight of rubber and 30 to 150 parts by weight of filler, preferably carbon black, and a further base mixture B contains 50 to 5 parts by weight of rubber and 80 to 5 parts by weight of filler, preferably carbon black, relative to 100 parts by weight of the total amount of rubber employed in the final mixture, and at least one of the base mixtures contains 2 to 30 parts by weight of a reinforcing resin system.

The use of two different base mixtures for the preparation of the vulcanizable final mixture is particularly preferred. In some cases, however, it can also be expedient and advantageous to start from a larger number of different mixtures containing proportions which differ as widely as possible of rubber, active filler and reinforcing resin system, preferably from 3 to 5 different mixtures which can also differ in the type of rubber present in them, and to combine these mixtures to form a vulcanizable final mixture according to the invention.

The present invention makes it possible to prepare rubber vulcanizates which exhibit a lower heat evolution under dynamic loading and thereby have a lower tendency to thermal degredation than comparable vulcanizates prepared from only one rubber mixture. Finished products made from the mixtures according to the invention thereby have a longer service life and a higher use value. In addition, a lower proportion of the energy put into the vulcanizates when under dynamic loading is converted into heat, so that there is also a lower consumption of energy, for example in the form of rolling resistance of vehicle tires, in the finished products. As part of the measures for saving energy in vehicles, this constitutes an unexpected and surprising advantage.

The rubber mixtures according to the invention contain at least one type of rubber and, as other constituents, customary substances, such as fillers, plasticizers, if appropriate thermoplastic copolymers, vulcanizing agents, accelerators, activators, reinforcing resin systems and, if appropriate, processing aids or special additives, such as waxes and the like.

The invention also relates to a process for the preparation of the rubber mixtures according to the invention from at least two different base mixtures, to their vulcanization and to their use, especially for the preparation of vulcanizates for mechanical goods.

Suitable types of rubber are the types of rubber customarily used, in particular, for example, natural rubber (NR), styrene/butadiene rubber (SBR), polybutadiene, polyisoprene, trans-polyoctenylene/butyl rubber, ethylene/ propylene/diene terpolymer rubber or mixtures thereof, such as are used, for example, in the tire industry or for the preparation of mechanical rubber goods. Styrene/ butadiene rubber and natural rubber or mixtures of these types of rubber with minor amounts of other types of rubber are preferred. They can be employed in any desired source form, for example in the form of balls or powder, and also, for example, with a content of carbon black.

In general, the reinforcing resins are phenol novolaks or other reactive polyphenols or polynuclear phenols, such as resorcinol, diphenylolpropane or diphenylolmethane or naphthols and analogous compounds. Examples of particularly suitable novolak resins are those which can be obtained from phenol and/or polyhydric, mononuclear or polynuclear phenols, such as, for example, resorcinol, bisphenols, such as, for example, diphenylolpropane and/or diphenylolmethane, or monohydric or polyhydric phenols which are substituted by a hydrocarbon group, such as, for example, alkylphenols or aralkylphenols, preferably having 1 to 20, especially 4 to 18 carbon atoms in the substituent, such as, for example, tert.butylphenol, octylphenol, nonylphenol, cashew nut oil, styrenated phenol or phenol which has been modified with fatty acids, such as linseed oil fatty acids, or phenylphenol, by reacting these with aldehydes, such as acetaldehyde, but preferably formaldehyde, in an acid medium. Phenolic resins modified with inorganic constituents are also suitable for reinforcing rubber, preferably, for example, types of phenolic resins modified with silicon, aluminum or boron compounds. The novolaks can also contain plasticizing components, such as, for example, polyethylene glycols, tall oil or other customary plasticizers. Novolaks obtained from phenol and mixtures of phenol and phenols substituted by a hydrocarbon group having 4 to 18 carbon atoms in the substituent, including cashew nut oil, are preferred for practical use. The proportion of the substituted phenols in the novolak can vary, but the novolak should still be capable of curing. In general, the proportion of nontrifunctional phenols in the total content of phenols is not higher than 80 mol %, preferably not higher than 65 mol %.

In accordance with the invention, the novolaks are employed in at least one of the base mixtures, preferably in an amount of 2 to 30, especially 2.5 to 27 and particularly preferably 3 to 25, parts by weight, relative to 100 parts by weight of the total amount of rubber employed in the final mixture.

The curing agents used for the phenol novolak can be any desired compounds which split off formaldehyde and/or free or etherified compounds containing methylol groups, for example amine resins, such as, for example, urea resins or benzoguanamine resins. Hexamethylenetetramine (described in the following text as "hexa") and melamine resins are preferred, however, the latter in the form of non-etherified or partly or largely etherified products and, if appropriate, more highly condensed polynuclear products. The degree of condensation of the aldehyde resins, in particular formaldehyde resins, and their content of free methylol groups can vary within certain limits. The free methylol groups can be etherified with monohydric alcohols having 1 to 12, preferably 1 to 8, carbon atoms, such as, for example, methanol, ethanol, the various isomeric propanols, butanols, nonanols or dodecyl alcohol. Hexamethoxymethyl melamine, for example, is widely used.

In general, the optimum amounts of curing agent required for curing the novolak resins must be determined in preliminary tests, which are easy to carry out. In general, about 2 to 60, preferably 5 to 50, % by weight of melamine resin or 2 to 30, preferably 2 to 25, % by weight of hexamethylenetetramine are used, relative to the novolak resin.

In addition to active carbon blacks and silicas, the fillers used can also be kaolins, chalk and/or other customary materials, as well as pigments. The use of carbon black is particularly preferred. In some cases the use of fillers is substantially dispensed with, for example in transparent mixtures. Suitable plasticizing oils are the products customary in the technology of rubber, especially naphthenic and aromatic oils.

The vulcanization of the rubber mixtures according to the invention can be carried out without sulfur by means of vulcanization resins. Vulcanization in the presence of sulfur is preferred, however. Its progress can be adapted to suit the practical requirements by selecting suitable accelerators, activators and regulators which are customary in the technology of rubber. It can also be advantageous to add antiaging agents to the vulcanizable mixtures in order to improve the properties of the vulcanizates further.

The initial rubber mixtures employed in accordance with the invention, such as, for example, the base mixtures A and B, can each be prepared in a customary manner in internal mixers or on mixing rolls. When the reinforcing resins are incorporated, it can be advantageous if the mixing temperature in some phase of preparing the mixture exceeds the melting point of the resins, but higher hardness values can be achieved, if appropriate, also by means of formulations in which, after the resins have been added, the mixing temperature remains below the melting point. It is also important that the curing agents should be incorporated under conditions such that premature selfcondensation or a premature reaction with the novolak to be cured does not take place. This can be achieved, for example, by incorporating the curing agents only at the end of the mixing process at temperatures which are not too high (in general at 80° to 120° C.). When preparation of the mixtures is complete, the separately prepared batches, such as, for example, the base mixtures A and B, are combined, mixed with one another and finally, if appropriate while being shaped, vulcanized at an elevated temperature in a customary manner.

The vulcanizates obtained in accordance with the invention can be used, for example, as components of vehicle tires, such as treads, side walls, bracing plies or cushions, and also as mechanical rubber goods, such as, for example, rubber sleeves, linings and conveyor belts. In this regard, the mixtures according to the invention can also be used in rubber layers which have to exhibit good adhesion to inlaid woven or braided materials. In order to improve the adhesion it is also possible, in addition, to use adhesion promoters, such as, for example, cobalt compounds or other metal compounds and/or combinations of silica, resorcinol and curing agent.

The invention is illustrated in greater detail by means of the following examples.

The tests described in the following examples serve to illustrate the composition of the rubber mixtures according to the invention and the properties of the vulcanizates prepared therefrom. In each of the examples according to the invention at least two different mixing batches, batch A and batch B, were prepared, differing markedly in their content of rubber, carbon black, oil and reinforcing resin. The resulting mixing batches A and B were then mixed with one another to give a combined or final mixture according to the invention and were vulcanized.

In the comparison examples, the vulcanizable combined mixture was prepared, for comparison, in a single mixing batch, the percentage composition of which corresponds in each case to that of the final mixture of one of the examples according to the invention, and the resulting combined mixture was vulcanized under conditions which were also comparable.

The components listed as other constituents (OC) of the mixtures in the examples or comparison examples were not varied and were added in the following proportions by weight, relative to 100 parts by weight of rubber:

2 parts by weight of stearic acid
3 parts by weight of zinc oxide
1 part by weight of N-isopropyl-N-phenyl-p-

-continued

|   | phenylenediamine* |
|---|---|
| 1 | part by weight of 2,2,4-trimethyl-1,2-dihydroquinoline* |
| 1.8 | parts by weight of sulfur |
| 1.5 | parts by weight of benzothiazole-2-cyclohexylsulfenamide** |
| 0.2 | part by weight of mercaptobenzothiazole |
| Total 10.5 parts by weight | |

*as antiaging agent
**as accelerator

The mixtures were prepared on a mixing roll. Vulcanization was carried out for 30 minutes at 155° C.

In the mixing process, the amount of carbon black still, if appropriate, lacking, and then the oil and the further components in the sequence stearic acid, zinc oxide and antiaging agent were added to the rubber or to a master batch containing carbon black. In the case of the batches containing a reinforcing resin, the latter was mixed in subsequently at temperatures between 90° and 100° C., and homogenization was carried out briefly at 110° to 120° C. The sulfur, the accelerator and the curing agent were mixed in, in the case of all the batches, at the end of the mixing process at temperatures below 100° C. The reinforcing resin used was a commercially available modified phenol novolak having a melting range from 70° to 80° C., measured by the capillary process, and a viscosity at 20° C. of 600 to 1,000 mPa.s in a 50% strength by weight solution in ethylene glycol monoethyl ether. The curing agent used was hexamethylenetetramine (hexa). When the final mixtures had been vulcanized, the following properties were determined on the resulting vulcanizates by the test methods customary in practice: ultimate tensile strength, elongation at break and stress moduli (at 10% to 300% elongation) as specified in DIN 53,504; Shore A hardness as specified in DIN 53,505; rebound resilience as specified in DIN 53,512; temperature rise after 5 and after 15 minutes exposure to stress in a flexural rolling test apparatus in which a test cylinder of diameter 20 mm and length 100 mm is subjected to dynamic deformation at an angle of deflection of 45° at one end at a speed of approx. 1,400 revolutions per minute; and plasticity of the unvulcanized mixtures in a Mooney shear-disk viscometer as specified in DIN 53,524.

Test results

The determinations were carried out on mixtures whose compositions are apparent from Tables 1 and 2. The results of the tests on the vulcanizates are also listed in Tables 1 and 2. Table 1 contains Examples 1 and 2 and Comparison Example 1 together with the corresponding mixture compositions and the test results on the vulcanizates.

TABLE 1

| Constituents of mixture | Example 1 | Example 2 | Comparison Example 1 |
|---|---|---|---|
| Batch A | | | |
| SBR rubber | 80 parts by wt. | 70 parts by wt. | |
| carbon black N 330 | 60 parts by wt. | 55 parts by wt. | |
| aromatic oil | 15 parts by wt. | 10 parts by wt. | |
| phenol novolak | 9 parts by wt. | 9 parts by wt. | |
| hexa | 1 part by wt. | 1 part by wt. | |
| other constituents (OC) | 8.4 parts | 7.35 parts | |

TABLE 1-continued

| Constituents of mixture | Example 1 | Example 2 | Comparison Example 1 |
|---|---|---|---|
| Batch B | by wt. | by wt. | |
| SBR rubber | 20 parts by wt. | 30 parts by wt. | |
| carbon black N 330 | 5 parts by wt. | 10 parts by wt. | |
| aromatic oil | — | 5 parts by wt. | |
| phenol novolak | — | — | |
| hexa | — | — | |
| other constituents (OC) | 2.1 parts by wt. | 3.15 parts by wt. | |
| Final mixture | | | |
| SBR rubber | 100 parts by wt. | 100 parts by wt. | 100 parts by wt. |
| carbon black N 330 | 65 parts by wt. | 65 parts by wt. | 65 parts by wt. |
| aromatic oil | 15 parts by wt. | 15 parts by wt. | 15 parts by wt. |
| phenol novolak | 9 parts by wt. | 9 parts by wt. | 9 parts by wt. |
| hexa | 1 part by wt. | 1 part by wt. | 1 part by wt. |
| other constituents (OC) | 10.5 parts by wt. | 10.5 parts by wt. | 10.5 parts by wt. |
| Mooney plasticity measured at 120° C. | | | |
| Batch A | 40 | 35 | — |
| Batch B | 33 | 21 | — |
| Final Mixture | 37 | 29 | 35 |
| Vulcanization time at 155° C. | 30 min | 30 min | 30 min |
| Test results on the vulcanizate: | | | |
| Ultimate tensile strength (MPa) | 17.0 | 17.9 | 17.3 |
| Elongation at break (%) | 327 | 425 | 469 |
| Stress modulus, 10% elongation (MPa) | 1.7 | 1.2 | 1.5 |
| Stress modulus, 50% elongation (MPa) | 3.0 | 2.2 | 2.4 |
| Stress modulus, 100% elongation (MPa) | 4.7 | 3.5 | 3.5 |
| Stress modulus, 200% elongation (MPa) | 10.3 | 8.1 | 7.2 |
| Rebound resilience at 23° C. (%) | 35 | 32 | 35 |
| Shore A hardness at 23° C. (°) | 82 | 77 | 86 |
| Temperature rise in the flexural rolling test apparatus after | | | |
| 5 minutes (°C.) | 43 | 36 | 63 |
| 15 minutes (°C.) | 54 | 47 | 73 |

The lower temperature rise measured on the vulcanizates when subjected to dynamic deformation at an identical composition of the final mixtures can be seen clearly from Examples 1 and 2 according to the invention, compared with the vulcanizate of Comparison Example 1 prepared from only a single mixing batch. Thus, in the flexural rolling test, the temperatures determined for comparison on the vulcanizates from the rubber mixtures according to the invention of Examples 1 and 2 were about 20° C. or more below the temperature measured on the vulcanizate of Comparison Example 1.

Table 2 contains Examples 3 and 4 and Comparison Example 2, together with the corresponding mixture compositions and the test results on the vulcanizates.

TABLE 2

| Constituents of mixture | Example 3 | Example 4 | Comparison Example 2 |
|---|---|---|---|
| Batch A | | | |
| SBR rubber | 80 parts by wt. | 70 parts by wt. | |
| carbon black N 330 | 50 parts by wt. | 45 parts by wt. | |
| aromatic oil | 5 parts by wt. | 5 parts by wt. | |
| phenol novolak | 18 parts by wt. | 18 parts by wt. | |
| hexa | 2 parts by wt. | 2 parts by wt. | |
| other constituents (OC) | 8.4 parts by wt. | 7.35 parts by wt. | |
| Batch B | | | |
| SBR rubber | 20 parts by wt. | 30 parts by wt. | |
| carbon black N 330 | 5 parts by wt. | 10 parts by wt. | |
| aromatic oil | — | 5 parts by wt. | |
| phenol novolak | — | — | |
| hexa | — | — | |
| other constituents (OC) | 2.1 parts by wt. | 3.15 parts by wt. | |
| Final mixture | | | |
| SBR rubber | 100 parts by wt. | 100 parts by wt. | 100 parts by wt. |
| carbon black N 330 | 55 parts by wt. | 55 parts by wt. | 55 parts by wt. |
| aromatic oil | 5 parts by wt. | 10 parts by wt. | 10 parts by wt. |
| phenol novolak | 18 parts by wt. | 18 parts by wt. | 18 parts by wt. |
| hexa | 2 parts by wt. | 2 parts by wt. | 2 parts by wt. |
| other constituents (OC) | 10.5 parts by wt. | 10.5 parts by wt. | 10.5 parts by wt. |
| Mooney plasticity measured at 120° C. | | | |
| Batch A | 44 | 33 | — |
| Batch B | 33 | 21 | — |
| Final Mixture | 31 | 28 | 26 |
| Vulcanization time at 155° C. | 30 min | 30 min | 30 min |
| Test results on the vulcanizate: | | | |
| Ultimate tensile strength (MPa) | 17.4 | 17.2 | 15.0 |
| Elongation at break (%) | 338 | 361 | 417 |
| Stress modulus, 10% elongation (MPa) | 2.4 | 2.1 | 2.8 |
| Stress modulus, 50% elongation (MPa) | 4.2 | 3.7 | 3.7 |
| Stress modulus, 100% elongation (MPa) | 6.3 | 5.9 | 4.9 |
| Stress modulus, 200% elongation (MPa) | 11.3 | 10.9 | 8.3 |
| Rebound resilience at 23° C. (%) | 38 | 37 | 38 |
| Shore A hardness at 23° C. (°) | 90 | 87 | 88 |
| Temperature rise in the flexural rolling test apparatus after | | | |
| 5 minutes (°C.) | 71 | 62 | 91 |
| 15 minutes (°C.) | 89 | 76 | 105 |

Examples 3 and 4 were carried out using a higher added amount of reinforcing resin, with the result that the vulcanizates 35 had both higher stress moduli and higher hardness values. Here too the heat evolved in the flexural rolling test in the case of the vulcanizates prepared in Examples 3 and 4 according to the invention was markedly lower when compared with the vulcanizate of Comparison Example 2.

We claim:

1. A rubber vulcanizate prepared from vulcanizable rubber mixtures containing at least one rubber and conventional compounding ingredients, wherein the rubber mixtures are comprised of different vulcanizable rubber component units, which units were prepared by mixing at least two rubber mixtures A and B of different compositions, the first mixture A containing 50 to 95 parts by weight of rubber and 30 to 150 parts by weight of filler, and a further mixture B containing 50 to 5 parts by weight of rubber and 80 to 5 parts by weight of filler, relative to 100 parts by weight of the total amount of rubber employed in the final mixture, and at least one of the base mixtures A and B containing 2 to 30 parts by weight of a reinforcing novolak resin system, the distribution of rubber, filler and reinforcing resin being homogeneous in the vulcanizate and the vulcanizate having a reduced temperature rise after exposure to stress in a flexural rolling test apparatus in which a test cylinder of diameter 20 mm and length 100 mm is subjected to dynamic deformation at an angle of deflection of 45° at one end at a speed of approximately 1,400 revolutions per minute.

2. The embodiment as claimed in claim 1, wherein the reinforcing resin novolack system is composed of a novolak and a curing agent which is incorporated together with this novolak or separately.

3. The embodiment as claimed in claim 2, wherein the curing agent is composed of hexamethylenetetramine or a melamine resin.

4. The embodiment as claimed in claim 3, wherein the novolak in mixture A is employed in an amount of 0 to 50 parts by weight, relative to 100 parts by weight of the total amount of rubber employed in the final mixture.

5. The embodiment as claimed in claim 1, wherein the novolak in mixture B is employed in an amount of 10 to 60 parts by weight, relative to 100 parts by weight of the total amount of rubber employed in the final mixture.

6. The embodiment as claimed in claim 1, wherein the novolak is composed of phenol or mixtures thereof with phenols which are substituted by a hydrocarbon group having up to 18 carbon atoms, and formaldehyde.

7. The embodiment as claimed in claim 1, wherein the rubber is composed of a member of the group consisting of styrene/butadiene rubber, natural rubber or mixtures of said rubber.

8. The embodiment as claimed in claim 1, wherein the active inorganic filler is composed, at least predominantly, of carbon black.

9. Mechanical rubber goods and tires prepared from rubber vulcanizates of claim 1.

* * * * *